United States Patent
Zhang et al.

(10) Patent No.: US 8,760,980 B2
(45) Date of Patent: Jun. 24, 2014

(54) PROTECTIVE OVERCOAT LAYER OF CARBON AND A SELECTED TRANSITION METAL

(71) Applicant: Seagate Technology LLC, Cupertino, CA (US)

(72) Inventors: Lihong Zhang, Singapore (SG); Samuel Gan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/777,696

(22) Filed: Feb. 26, 2013

(65) Prior Publication Data

US 2014/0140180 A1 May 22, 2014

Related U.S. Application Data

(60) Provisional application No. 61/728,711, filed on Nov. 20, 2012.

(51) Int. Cl.
*G11B 11/00* (2006.01)

(52) U.S. Cl.
USPC ............ 369/13.35; 369/13.33; 360/135; 428/814; 428/833.2

(58) Field of Classification Search
USPC .......... 369/13.33, 13.35, 275.2; 428/814, 428/817–825, 833.2, 833.3; 360/135
See application file for complete search history.

(56) References Cited

U.S. PATENT DOCUMENTS

| | | | | |
|---|---|---|---|---|
| 4,777,068 A * | 10/1988 | Omata et al. | | 428/69 |
| 4,840,843 A * | 6/1989 | Sano et al. | | 428/336 |
| 4,876,117 A * | 10/1989 | Bornstein | | 427/130 |
| 4,995,024 A * | 2/1991 | Arimune et al. | | 369/13.35 |
| 5,599,590 A * | 2/1997 | Hayashi et al. | | 427/448 |
| 5,609,948 A | 3/1997 | David et al. | | |
| 5,624,725 A * | 4/1997 | Nelson et al. | | 428/827 |
| 6,009,064 A | 12/1999 | Hajjar | | |
| 6,683,845 B2 * | 1/2004 | Kishima et al. | | 369/275.2 |
| 6,829,201 B2 * | 12/2004 | Nishikawa et al. | | 369/13.38 |
| 6,835,523 B1 | 12/2004 | Yamazaki et al. | | |
| 6,875,492 B1 * | 4/2005 | Pirzada et al. | | 428/833.2 |
| 7,195,828 B2 * | 3/2007 | Gunsel et al. | | 428/835.6 |
| 7,244,522 B2 * | 7/2007 | Gunsel et al. | | 428/835.6 |
| 7,700,164 B2 | 4/2010 | Yamazaki et al. | | |
| 8,014,104 B2 | 9/2011 | Cheng et al. | | |
| 8,049,993 B2 * | 11/2011 | Shirotori et al. | | 360/135 |
| 8,241,834 B2 * | 8/2012 | Yasuda et al. | | 430/270.13 |
| 2004/0253539 A1 * | 12/2004 | Uno et al. | | 430/270.13 |
| 2010/0165508 A1 * | 7/2010 | Girt et al. | | 360/135 |
| 2010/0195249 A1 * | 8/2010 | Tsuda | | 360/135 |
| 2010/0309584 A1 * | 12/2010 | Yasumori et al. | | 360/135 |

* cited by examiner

*Primary Examiner* — Brenda Bernardi
(74) *Attorney, Agent, or Firm* — Hall Estill Attorneys at Law

(57) ABSTRACT

Apparatus for recording data and method for making the same. In accordance with some embodiments, a magnetic recording layer is adapted to store data along perpendicular magnetic domains. A protective overcoat layer is formed on the magnetic recording layer to substantially protect the magnetic recording layer from environmental effects. The protective overcoat layer is made of carbon intermixed with at least one transition metal, such as but not limited to chromium.

18 Claims, 4 Drawing Sheets

PROTECTIVE OVERCOAT LAYER OF CARBON AND A SELECTED TRANSITION METAL

RELATED APPLICATIONS

This application makes a claim of domestic priority to U.S. Provisional Patent Application No. 61/728,711 filed Nov. 20, 2012, the contents of which are hereby incorporated by reference.

SUMMARY

Various embodiments of the present disclosure are generally directed to an apparatus for recording data and method for making the same.

In accordance with some embodiments, a magnetic recording layer is adapted to store data along perpendicular magnetic domains. A protective overcoat layer is formed on the magnetic recording layer to substantially protect the magnetic recording layer from environmental effects. The protective overcoat layer comprises carbon intermixed with at least one transition metal, such as but not limited to chromium.

These and other features of various embodiments can be understood from a review of the following detailed description in conjunction with the accompanying drawings.

DETAILED DESCRIPTION

Figure 1:
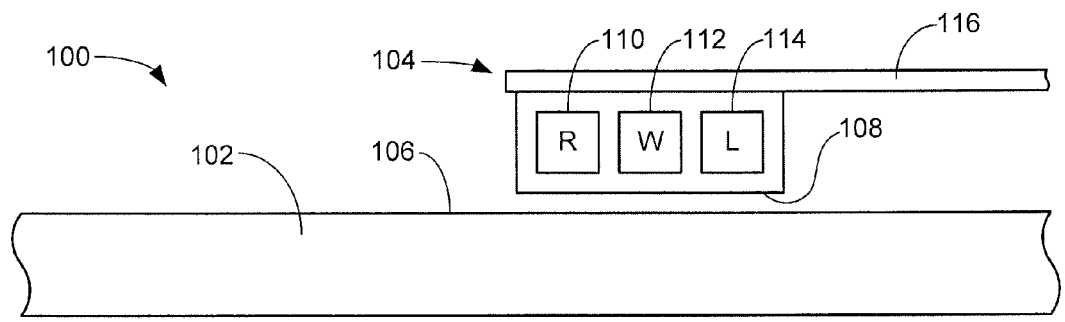
FIG. 1 depicts a data recording system in accordance with some embodiments.

The present disclosure is generally directed to perpendicular data recording systems. In a perpendicular recording system, a magnetic sequence is written to a recording structure of a medium with magnetic domains that extend in a direction generally perpendicular to a direction of movement of the medium (e.g., in a "vertical" direction perpendicular to one or more "horizontal" recording layers).

A perpendicular recording medium can take a variety of forms. Some common configurations include a substrate, a soft underlayer (SUL), one or more intermediate layers, one or more recording layers, and a protective carbon overcoat (COC). A layer of lubricant may be applied to the COC to reduce damage from contact between the medium and a read/write transducer used to transduce data with the medium.

Some perpendicular recording systems employ so-called heat assisted magnetic recording (HAMR) techniques to enhance data density and reliability. HAMR techniques generally involve using a source of thermal energy, such as a laser, to apply localized heating to a magnetic storage medium. The heating temporarily reduces the magnetic coercivity (and anisotropy energy) of a magnetic recording layer of the medium, allowing an applied magnetic field from the transducer to write data to the recording layer. The written area quickly cools, restoring the former high coercivity (and anisotropy energy) state. HAMR techniques can potentially support recorded data bit densities in the range of around 10 to 40 terabits/in$^2$ ($10^{12}$ bits/in$^2$) or more.

It is generally desirable to provide a relatively small, focused beam to avoid heating of adjacent areas on the medium not subject to a write operation. At the same time, the power level of the beam should be sufficiently high to ensure the localized area is heated sufficiently to enable the transducer to write the data to the area. One example write beam size found to provide adequate operational performance in some cases delivers over about 50 microwatts, μw ($10^{-6}$ watts) to a spot size of no more than about 30 nanometers, nm ($10^{-9}$ meters). However, as much as 95% or more of the applied light energy may be lost before penetrating to the recording layer.

Accordingly, various embodiments of the present disclosure are generally directed to an improved perpendicular recording medium and method for forming the same. As explained below, in some embodiments a medium is formed having at least one recording layer. A protective overcoat layer is formed on the at least one recording layer to substantially protect the at least one recording layer from environmental effects. The protective overcoat layer comprises carbon and at least one transition metal. In some embodiments, the at least one transition metal is chromium (Cr).

While not necessarily limited, it is further contemplated that in at least some embodiments the medium is written using HAMR techniques. It is contemplated that the protective overcoat will tend to provide enhanced environmental protection and enhanced energy coupling between the medium and a source of thermal energy (e.g., HAMR laser, near field transistor, etc.).

These and other features of various embodiments can be understood beginning with a review of FIG. 1 which represents aspects of a data storage system 100. The system 100 includes a rotatable data recording medium 102 and an adjacent data transducer 104. The data transducer 104 is characterized as employing heat assisted magnetic recording (HAMR), although such is merely by way of illustration and not limiting.

Generally, the medium 102 and the transducer 104 may be incorporated into a hard disc drive (HDD) or other data storage device in which multiple axially arranged recording media (discs) and HAMR data transducers are used to read and write user data from a host device.

In some embodiments, the data are stored on the medium 102 along a number of concentric tracks (not shown) defined along a surface 106 of the medium. The data may be stored in the form of addressable user data sectors of fixed size along the tracks. Hydrodynamic features (such as an air bearing surface 108) may be provisioned on a facing surface of the transducer 104 to enable the transducer to be fluidically supported in close proximity to the medium surface 106 by atmospheric currents established during rotation of the medium 102.

The data transducer 104 is shown to include respective read (R), write (W) and light source (L) elements 110, 112 and 114. The read element 110 may take the form of a magnetoresistive (MR) sensor. The write element 112 may include a write coil and one or more magnetically permeable cores. The light source 114 may take the form of a laser diode, a near field transistor (NFT), or other radiation beam and/or thermal energy source.

During a read operation, the read element 110 operates to sense a magnetization sequence written to the medium 102 along a portion of a selected track. During a write operation, the light source element 114 projects a high powered irradiation "dot" on the rotating medium 102 to locally increase the temperature of the medium, and the write element 112 directs magnetic flux into the heated portions of the medium to write a desired magnetization sequence. The transducer 104 is supported by an actuator arm 116, which, responsive to a servo control system (not shown), radially positions the respective elements 110, 112 and 114 adjacent the disc surface 106 as required.

It will be appreciated that the system represented in FIG. 1 can be readily adapted for a non-HAMR application, in which case the light source element 114 is omitted. It has been found, for example, that formulations of media as disclosed herein are suitable for use in a wide variety of media, such as ECC+CGC perpendicular recording media.

HAMR recording techniques such as depicted in FIG. 1 allows the use of high anisotropy medium magnetic materials such as iron-platinum (FePt) alloys. As noted above, the HAMR light source provides localized heating to temporarily reduce the anisotropy energy of the magnetic bit locations in the medium so that the electromagnetic writer element can write to the bit locations. The light beam in a HAMR application will tend to be many times smaller than its diffraction limit to avoid undesirable heating of adjacent areas, while the power level of the beam needs to be sufficiently high to accomplish the task of reducing the medium magnetic anisotropy energy.

Figure 2:
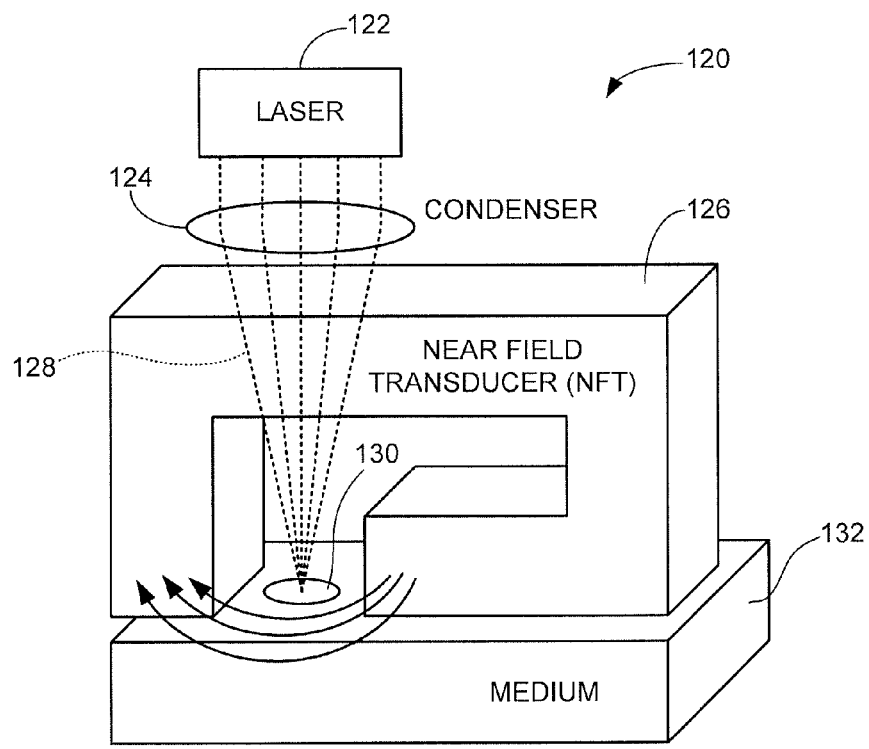
FIG. 2 illustrates a near-field based heat assisted magnetic recording (NFT-HAMR) system suitable for use in the system of FIG. 1.

Near field transducers (NFTs) are sometimes used to meet these beam size and power level requirements. FIG. 2 represents an NFT-based HAMR system 120 with a light source (e.g., incident laser) 122, a condenser 124 and an NFT 126. The condenser 124 represents a first stage and the NFT 126 represents a second stage. These elements cooperate to direct an electromagnetic radiation (e.g., light) beam 128 onto a small spot 130 on a medium 132. It is contemplated that the spot has a diameter of no more than about 30 nm and is provided with sufficient transmitted power as to reduce the magnetic coercivity and anisotropy energy of the medium.

The NFT 126 enhances the light efficiency by combining various effects such as plasmonic resonance, surface enhancement, lightening rod collection, etc. Using an enhanced overcoat layer on the medium 132 with high efficiency plasmon response characteristics, as disclosed herein, can further improve the laser-medium coupling efficiency during HAMR recording operations.

Figure 3:
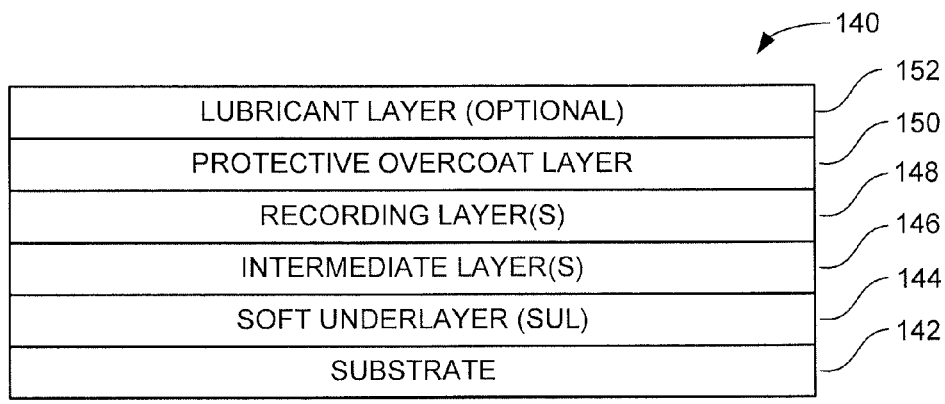
FIG. 3 provides an arrangement for a perpendicular recording medium of FIGS. 1-2 having a protective overcoat layer formed in accordance with some embodiments.

FIG. 3 is a schematic depiction of various layers of an example recording medium 140 useful in a data storage system such as described above in FIGS. 1 and 2. Other media configurations can readily be used, including configurations with different numbers and/or orderings of layers. It will be appreciated that FIG. 3 is functional in nature and is not drawn to scale so that each of the respective layers shown in FIG. 3 will have its own respective thickness. Each layer may be formed from a plurality of layers of like or different construction. Seed layers, intermediate layers, coupling layers, etc. may also be used as desired.

A base substrate 142 provides mechanical support for the medium 140. A recording structure is formed on the base substrate 142 made up of a number of layers. A soft magnetic underlayer (SUL) 144 is formed on the substrate, such as via sputtering. The SUL 144 provides a return path for magnetic flux during a data recording operation. One or more intermediate layers, also referred to as interlayers (IL), are formed on the SUL as shown at 146. The interlayers 146 are configured to establish a magnetic easy axis in the perpendicular direction, and may have high surface roughness to induce grain separation in the subsequently deposited recording layers.

One or more recording layers 148 are formed on the interlayers 146. The recording layers 148 may be provided with lower layers having relatively higher magnetization, anisotropy and exchange coupling levels and upper layers with softer magnetization and anisotropy. The recording layers 148 will have grain separation sufficient for the intended bit density. Any number of suitable recording structure configurations can be used as desired.

A protective overcoat layer 150 is formed on the topmost recording layer 148. Various configurations of the protective overcoat layer 150 will be discussed in detail below. At this point it will be appreciated that the protective overcoat layer 150 is configured to substantially protect the medium against environmental effects, such as inadvertent contact between the medium 140 and the transducer (e.g., 104 in FIG. 1). The overcoat layer 150 can further provide enhanced energy coupling between the medium 140 and a HAMR recording system such as discussed in FIG. 2. As desired, an optional lubricant layer 152 can be formed on the protective overcoat layer 150.

In some embodiments, the protective overcoat layer 150 comprises a carbon layer having a selected transition metal component. As used herein, transition metals will be understood as comprising group III-XII, Period 4-7 elements. In some cases, the transition metal is chromium (Cr). In other cases, the transition metal is manganese (Mn), iron (Fe), cobalt (Co), ruthenium (Ru), palladium (Pd), platinum (Pt) or alloys thereof. More than one transition metal may be incorporated into the overcoat layer. The selected transition metals may be non-magnetic.

Chromium is a suitable material for the overcoat layer 150 as it is a non-magnetic material and is highly corrosion resistant. It has been found that chromium-carbon overcoats arranged as nano-composite films do not introduce significant trobology issues. Enhanced chemical bonding effects with the lubricant have also been observed. Embedding the chromium within the carbon matrix provides superior wear and thermal coupling performance.

Any suitable materials can be used to form the recording layers 148, such as Fe, Pt, alloys thereof, etc. The transition metal component of the carbon overcoat layer 150 may be selected to enhance plasmonic coupling to the underlying magnetic components of the recording layers 148.

Figures 4, 5:
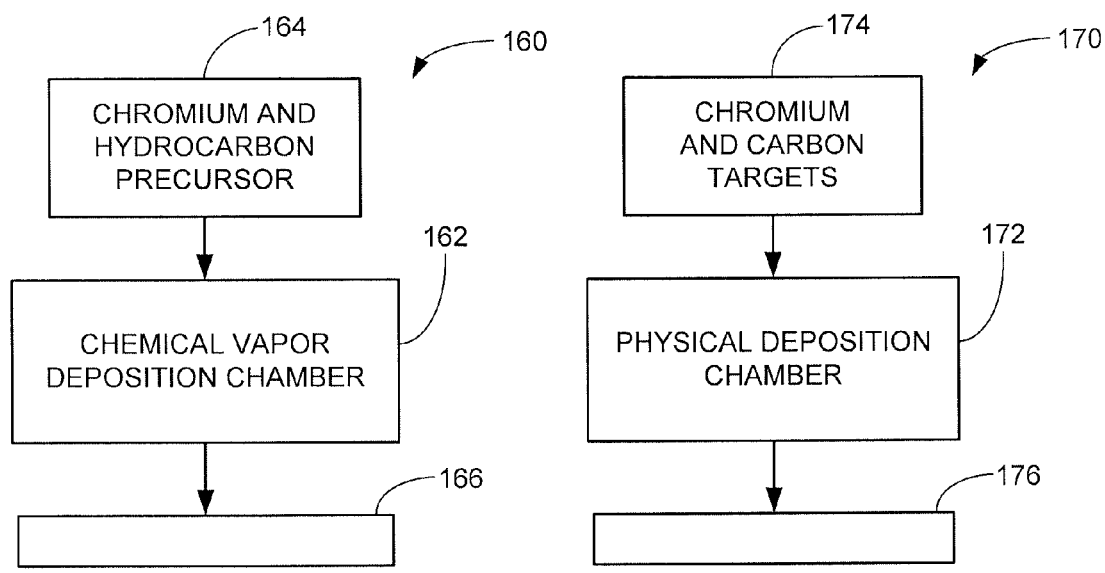
FIG. 4 depicts an example chemical vapor deposition (CVD) process suitable for forming the protective overcoat layer.
FIG. 5 depicts an example physical deposition (PD) process suitable for forming the protective overcoat layer.

The carbon-chromium protective layer 150 can be formed using a variety of manufacturing techniques. FIG. 4 depicts a chemical vapor deposition process 300 that utilizes a chemical vapor deposition chamber 162 and a chromium-hydrocarbon precursor 164 to deposit the protective overcoat layer onto a substrate 166. It is noted that the precursor provides concurrent release of both carbon and chromium onto the substrate to form the resulting layer 150. The concentration of elements can be controlled both by the composition of the precursor and the gas flow rate. Other metal-carbon hybrid nano-composite films can be produced using the metal and hydrocarbon precursor vapors.

FIG. 5 depicts a physical vapor deposition process 170 that utilizes a physical vapor deposition chamber 172 and one or more chromium and carbon targets 174 that emit chromium and carbon ions for concurrent deposition on a substrate 176.

Magnetron-based sputtering, cathodic arc deposition and pulsed laser techniques can be used during the physical deposition process, as desired. To deposit the transition metal-carbon non-composite such as Cr—C hybrid overcoats, a hybrid target can be used having both elements present thereon at a desired elemental ratio to correspond to the final ratio of the hybrid layer. Separate targets, one or more each of chromium and carbon, can also be used. The respective proportions of each can be controlled using a variety of techniques such as target sizes, hybrid target composition, plasma power, substrate bias and plasma gas ratios.

Figure 6:
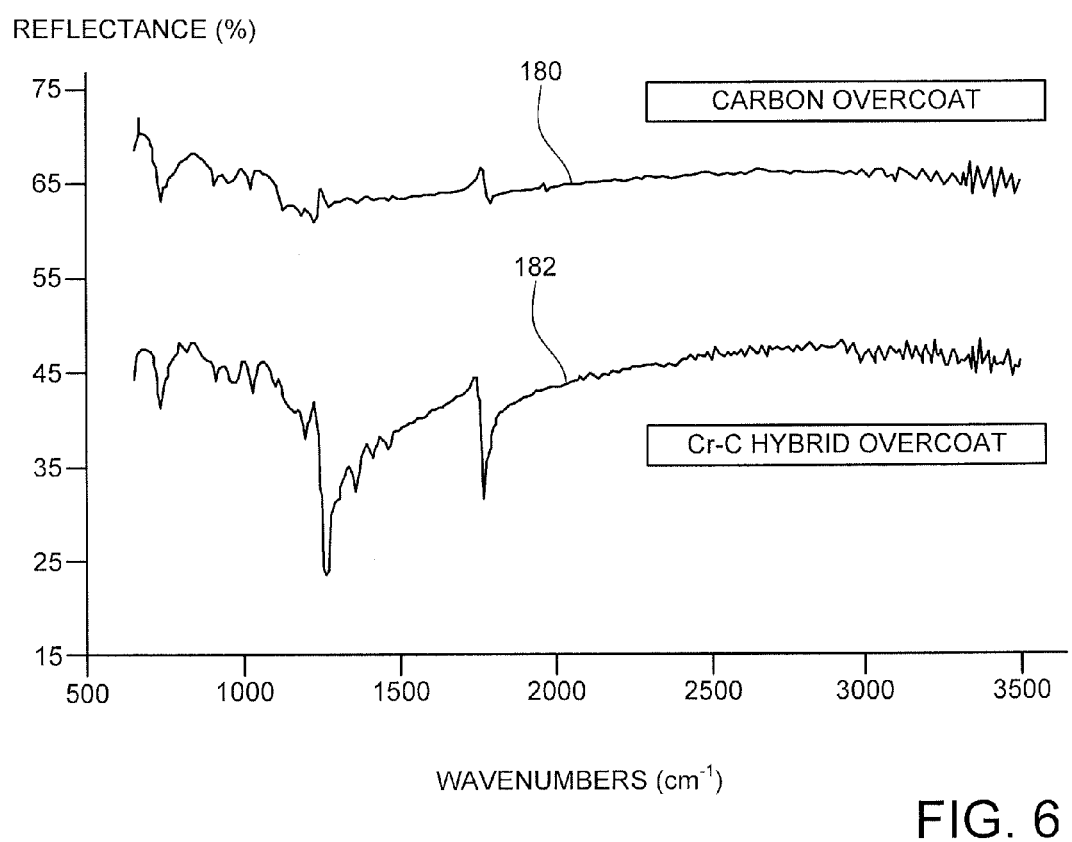
FIG. 6 is a graphical illustration of performance characteristics of the protective overcoat layer in comparison to a traditional carbon overcoat layer.

FIG. 6 depicts graphically improvements that have been observed through the use of transition metal-carbon protective overcoat layers. In one example, two samples were prepared: a first sample comprised a first substrate on which was formed a conventional carbon overcoat protective layer using chemical vapor deposition, and a second sample comprised a second substrate on which was formed a nano-composite film of Cr—C using chemical vapor deposition. Both layers had nominally the same thickness. A 10 nm thick layer of lubricant was applied to both samples to simulate real-world perpendicular media responses.

Laser enhancement was applied to both samples to provide a first response curve 180 for the carbon overcoat layer and a second response curve 182 for the Cr—C hybrid overcoat layer. The curves 180, 182 are plotted against a wavenumber (reciprocal of wavelength) x-axis 184 and a reflectance (in percentage) y-axis 186.

As can be seen from FIG. 6, the Cr—C hybrid overcoat from response curve 182 provides reduced reflectance performance as compared to the carbon overcoat from response curve 180. Average reflectance for the carbon overcoat layer is about 65% and average reflectance is less than about 45% for the Cr—C hybrid overcoat. This 20% improvement translates to more efficient transmission and absorption of the applied optical energy and more efficient heating. IR peaks 186, 188 are attributed to the vibrations of chemical bonds in the applied lubricant layer.

Figure 7:
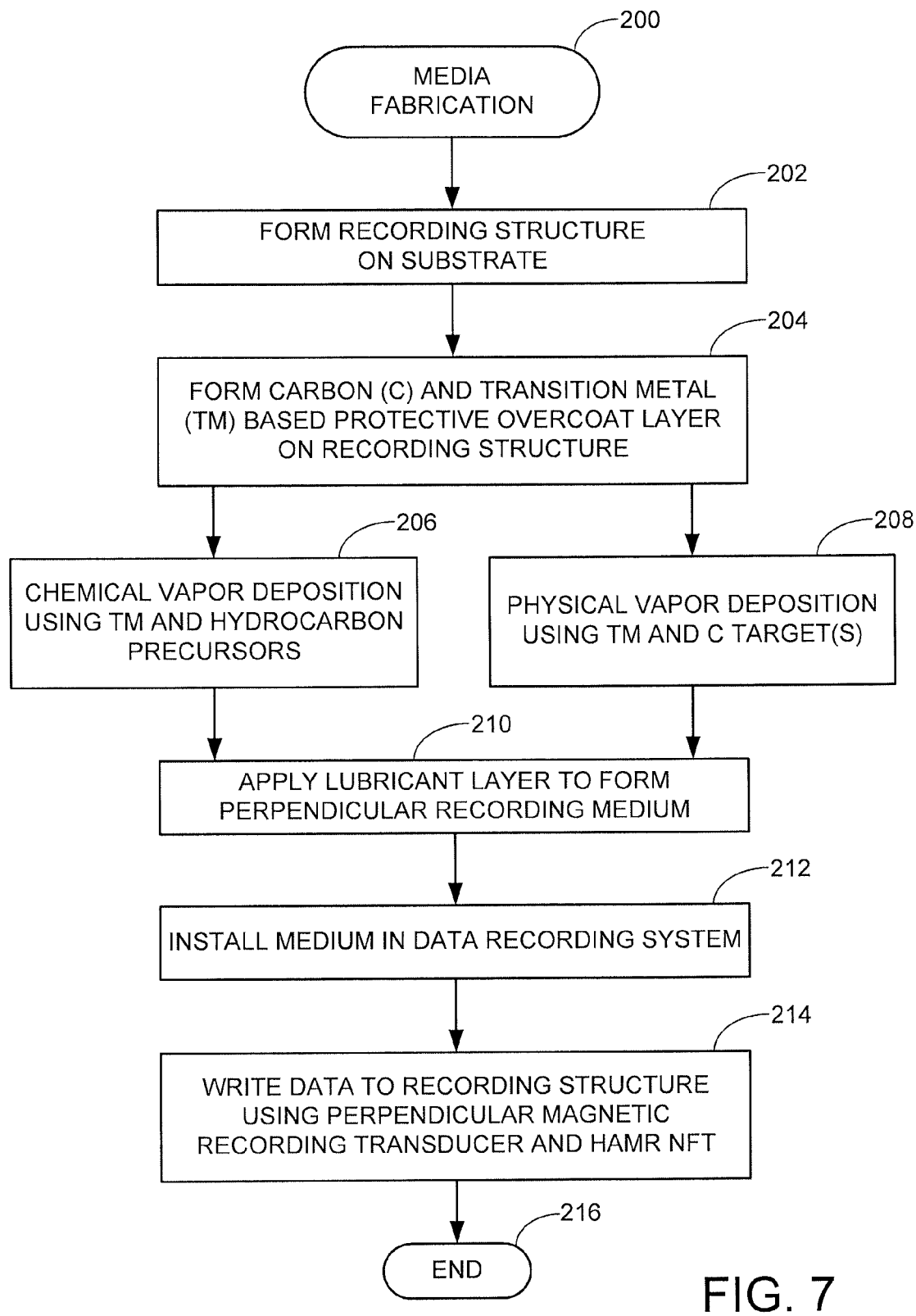
FIG. 7 is a flow chart for a MEDIA FABRICATION routine illustrative of steps carried out in accordance with some embodiments.

FIG. 7 is a flowchart for a MEDIA FABRICATION routine 200, generally illustrative of steps that can be carried out in accordance with the foregoing discussion to form a perpendicular magnetic recording medium. It will be appreciated that the various steps in FIG. 7 are illustrative only and any number of modifications, additions, omissions and reordering of steps can be carried out as desired. For purposes of providing a concrete example, the routine will be contemplated as forming a data recording medium such as 140 in FIG. 3 for use in a HAMR-based recording system as depicted in FIGS. 1-2.

A recording structure is initially formed on a substrate at step 202. This can be carried out using a variety of known processes. In some cases, a glass substrate may have deposited thereon various layers to support perpendicular recording operations including a soft underlay, one or more interlayers and one or more magnetic recording layers, as discussed above in FIG. 3. It is contemplated that the topmost layer of the recording structure is a recording layer with magnetic grains and relatively high magnetic coercivity and anisotropy energy characteristics to support high density perpendicular recording.

A carbon (C) and transition metal (TM) hybrid protective overcoat layer is formed on the recording structure at step 204. The formation of the hybrid overcoat layer can be carried out via a chemical vapor deposition process as indicated at step 206, or a physical vapor deposition process as denoted at step 208. These are merely illustrative as other processes can be used as desired to concurrently deposit the TM and C into a hybrid nano-film layer. For purposes of the present discussion, it will be contemplated that the transition metal is chromium (Cr) so that the resulting protective layer is a Cr—C hybrid layer as discussed in FIG. 6.

A lubricant layer is deposited onto the Cr—C hybrid layer at step 210. The lubricant can be any number of lubricants suitable for a high temperature, high wear environment. The application of the lubricant layer results in a final finished rotatable perpendicular recording medium (disc) which is subsequently installed into a data recording system, such as a hard disc drive (HDD), at step 212. Thereafter, data are written to the recording structure of the medium at step 214 using a perpendicular magnetic recording transducer (e.g., write element 112 in FIG. 1) and an NFT-HAMR system (e.g., system 120 in FIG. 2). The process then ends at step 214.

From the foregoing discussion it will now be appreciated that the various embodiments disclosed herein provide an overcoat layer for a recording medium with incorporated nano-particles of a suitable transition metal, such as chromium, into a carbon overcoat matrix to enhance wear characteristics and light-medium coupling efficiency. The layer has been found to improve near-field transducer efficiency in an NFT-HAMR environment.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a magnetic recording layer having data oriented along perpendicular magnetic domains; and
a protective overcoat layer on the magnetic recording layer to protect the magnetic recording layer from environmental effects, the protective overcoat layer formed with a chromium and hydrocarbon precursor and comprising carbon intermixed with chromium.

2. The apparatus of claim 1, further comprising a lubricant layer on the protective overcoat layer.

3. The apparatus of claim 1, in which the magnetic recording layer and the protective overcoat layer are incorporated into a perpendicular recording medium.

4. The apparatus of claim 3, further comprising a data transducer adjacent the perpendicular recording medium comprising a write transducer corresponding to the magnetic recording layer.

5. The apparatus of claim 4, in which the data transducer further comprises a thermal source that directs a beam of radiation energy to the medium during heat assisted magnetic recording (HAMR), wherein the protective overcoat layer enhances energy coupling between the recording layer and the thermal source.

6. The apparatus of claim 5, in which the thermal source comprises a laser, a condenser lens and a near-field transducer (NFT) to focus the beam onto a spot of the medium.

7. The apparatus of claim 1, further comprising a layer of lubricant applied to the protective overcoat layer, wherein the lubricant and the protective overcoat layer provide a reflectance of less than about 50% of a light beam applied to the medium during heat assisted magnetic recording (HAMR).

8. An apparatus comprising:
a substrate;

a recording structure supported by the substrate to store data in perpendicular magnetic domains; and a protective overcoat layer on the magnetic recording layer, the protective overcoat layer formed with a chromium and hydrocarbon precursor and comprising a nano-film layer of carbon and chromium intermixed to enhance wear and thermal coupling characteristics.

9. The apparatus of claim 8, further comprising a lubricant layer on the protective overcoat layer.

10. The apparatus of claim 9, in which the lubricant layer and the protective overcoat layer provide a reflectance of less than about 50% of a light beam applied to the medium during heat assisted magnetic recording (HAMR).

11. The apparatus of claim 8, in which the substrate, recording structure and protective overcoat layer form a perpendicular recording medium, and the apparatus further comprises a data transducer adjacent the medium, the data transducer comprising a magnetic write transducer directing a magnetic field to write a sequence of data bits in said perpendicular magnetic domains.

12. The apparatus of claim 11, in which the apparatus further comprises a heat assisted magnetic recording (HAMR) system comprising a light source that directs a beam of radiation energy to the medium during application of said magnetic field by the write transducer, the protective overcoat layer increasing a thermal transfer efficiency of the HAMR system.

13. A method comprising:

forming a magnetic recording layer; and depositing a mixture of carbon and chromium onto the magnetic recording layer with a chromium and hydrocarbon precursor to form a protective overcoat layer to protect the magnetic recording layer from wear.

14. The method of claim 13, in which the mixture is deposited using a chemical vapor deposition process.

15. The method of claim 14, in which the chemical vapor deposition process varies gas flow rate to control concentration of the carbon and at least one transition metal.

16. The method of claim 13, in which the mixture is deposited using a physical vapor deposition process.

17. The method of claim 16, in which the physical vapor deposition process uses at least one target comprising chromium and at least one target comprising carbon.

18. The method of claim 13, further comprising applying a lubricant layer on the protective overcoat layer to form a perpendicular recording medium.

\* \* \* \* \*